United States Patent [19]
Barakat et al.

[11] Patent Number: 5,313,593
[45] Date of Patent: May 17, 1994

[54] PERSONAL COMPUTER SYSTEM WITH BUS NOISE REJECTION

[75] Inventors: Edmond H. Barakat; Arthur L. Chin; Eric B. Schorn, all of Boca Raton, Fla.

[73] Assignee: International Business Machines Corp., Armonk, N.Y.

[21] Appl. No.: 947,018

[22] Filed: Sep. 17, 1992

[51] Int. Cl.$^5$ .............................................. G06F 13/00
[52] U.S. Cl. .................................. 395/325; 395/550
[58] Field of Search ............... 395/325, 200, 275, 550; 371/4, 29.5, 61

[56] References Cited

U.S. PATENT DOCUMENTS

| | | | |
|---|---|---|---|
| 5,125,084 | 6/1992 | Begun et al. | 395/375 |
| 5,191,657 | 3/1993 | Ludwig et al. | 395/325 |
| 5,193,170 | 3/1993 | Lam | 395/425 |
| 5,199,106 | 3/1993 | Bourke et al. | 395/275 |

Primary Examiner—Michael R. Fleming
Assistant Examiner—Glenn A. Auve
Attorney, Agent, or Firm—Daniel E. McConnell

[57] ABSTRACT

This invention relates to personal computers, and more particularly to a personal computer system having a signal passing component operatively connected for exchange of data signals with system components operatively connected with a local processor bus and having a segment providing a state machine for receiving external command signals passed on one of the system busses and for passing internal command signals identifying valid data intervals, said state machine requiring a predetermined minimum length of external command signal for issuance of an internal command signal and terminating an internal command signal with termination of an external command signal so as to avoid the adverse effects of crosstalk and transmission line noise on external commands signals and loss of data integrity thereby possibly occurring.

6 Claims, 5 Drawing Sheets

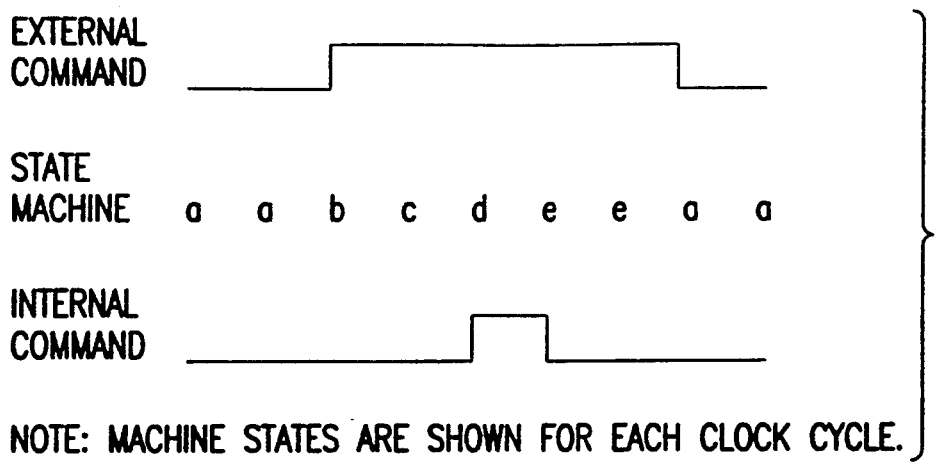
FIG.5
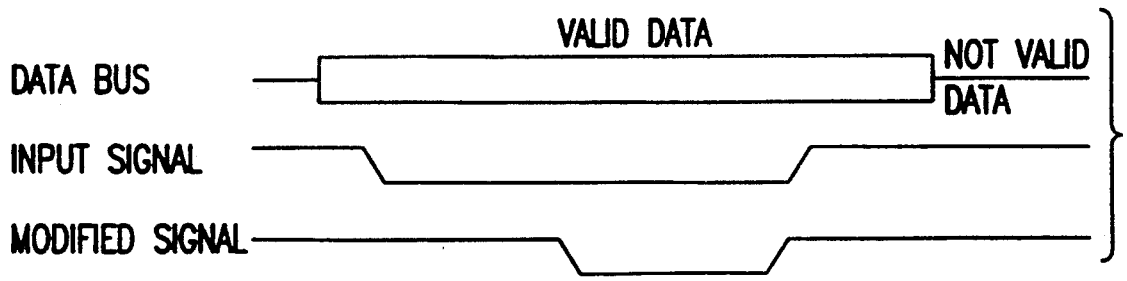
FIG.6
FIG.7

PERSONAL COMPUTER SYSTEM WITH BUS NOISE REJECTION

TECHNICAL FIELD

This invention relates to personal computers, and more particularly to a personal computer system having provision for rejection of noise generated on a data transfer bus.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 56, 57, 65, 70, 80, 90 and 95.

These systems can be classified into two general families. The first family, usually referred to as Family I Models, predominantly use an I/O bus architecture exemplified by the IBM PERSONAL COMPUTER AT and other "IBM compatible" machines. This bus architecture is referred to in this description as the "AT bus" and is also known as the "Industry Standard Architecture" or "ISA". This bus architecture is generally known, having been described both in technical manuals available from IBM and in more popularized texts such as The Winn Rosch Hardware Bible (Brady, N.Y., 1989). The interested reader is referred to those texts for further detailed information about this bus architecture. Many Family I models have used the popular Intel 8088 or 8086 microprocessor as the system processor. These processors have the ability to address one megabyte of memory. More recently, some Family I models have used high speed microprocessors of the 80286, 80386 or 80486 types.

As personal computer technology has developed and moved from eight to sixteen and eventually thirty two bit wide bus interaction and higher speed microprocessors, performance capability has been sought by separating the architecture of the personal computer into varying bus areas. More specifically, in the original IBM PC, what came to be known as the expansion bus was essentially a direct extension of the microprocessor connections, buffered and demultiplexed as required. Later, as the AT bus specification was developed and came into wide use, it became possible to sever the nearly direct connection between the microprocessor and the bus, giving rise to the presence of what became known as the local processor bus and the renaming of the expansion bus as the input/output (or I/O) bus. Typically, in order to enhance performance, the local processor bus runs at a higher clock speed (typically expressed in Hertz) than does the input/output bus. The IBM AT architecture also opened the possibility of running more than one microprocessor on the input/output bus, through use of direct memory access (DMA) interrupts.

The second family, referred to as Family II Models, use IBM's MICRO CHANNEL bus architecture exemplified by IBM's PERSONAL SYSTEM/2 Models 50 through 95. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. The Family II personal computers are of little significance with regard to the present invention, except as an illustration of the use of higher capability microprocessors. Such microprocessors have also found their way into use in AT bus architecture personal computers (as mentioned above), notwithstanding what may be some technical limitations on the effectiveness of those processors due to a more limiting bus architecture.

The AT bus is designed with three different busses in the system. These are the local processor bus, where the system processor or CPU, any numeric co-processor provided, and a processor support chip reside; the I/O or option bus (also known as the AT bus) where adapter cards reside; and a bus here known as the XD bus (also known as the planar I/O bus) which is between the local processor and AT busses and on which certain standard I/O device controllers reside.

The characteristics of the three busses differ one from another. Partly as a consequence and partly due to increasing speeds of operation as enhanced performance is sought, crosstalk and transmission line noise on the AT bus becomes problematical. When such noise appears with a command signal such as an Input/output Read (-IOR) command, flags may be inadvertently reset or data completely lost. When such noise appears with a command signal such as an Input/Output Write (-IOW) command, incorrect data may be written.

Generally, commands on the AT bus are decoded by simple combinational logic. Thus, crosstalk and transmission line noise on I/O inputs are seen as short, false transitions and result in short, false commands being decoded. These commands can result in data integrity problems.

BRIEF DESCRIPTION OF THE INVENTION

Having in mind the foregoing discussion, this invention replaces the combinational logic used heretofore with a finite state machine that requires that certain conditions indicative of a valid command be met. In making this change, the present invention obviates the risks of data integrity loss otherwise appearing with efforts to achieve ever higher levels of performance in a AT bus system.

BRIEF DESCRIPTION OF THE DRAWINGS

Some of the objects of the invention having been stated, other objects will appear as the description proceeds, when taken in connection with the accompanying drawings, in which:

FIG. 5 is a timing diagram illustrating external and internal commands received by and issuing from a state machine incorporated in accordance with this invention and the corresponding status of the state machine;

FIG. 6 is a table reflecting the progression of the state machine of this invention through a sequence of states; and FIG. 7 is an illustration of the manner in which the state machine of this invention modifies an input signal in the form of an external command in order to assure data transfer during a valid data interval.

DETAILED DESCRIPTION OF INVENTION

Figure 1:
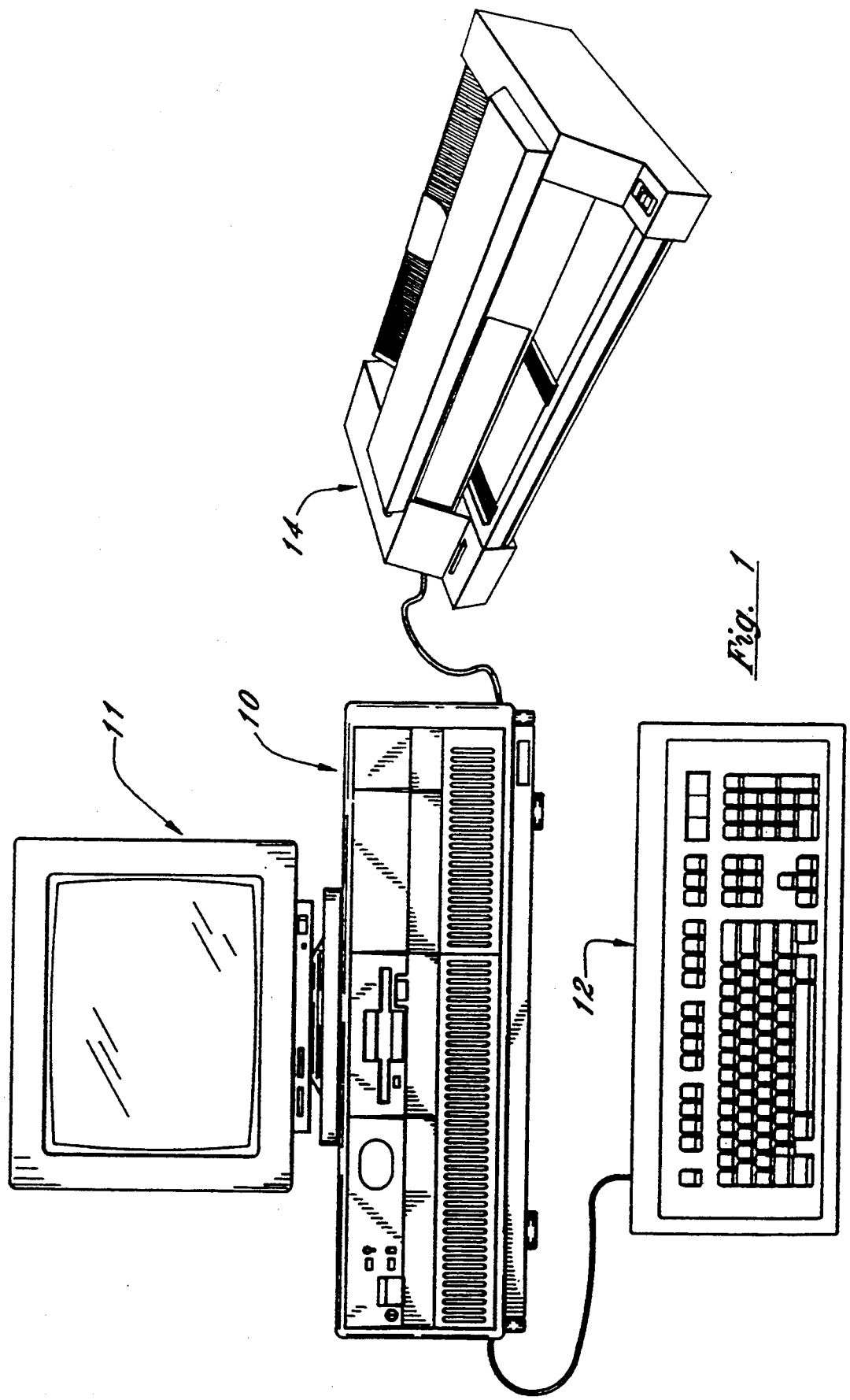
FIG. 1 is a perspective view of a personal computer embodying this invention.

Referring now more particularly to the accompanying drawings, a personal computer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
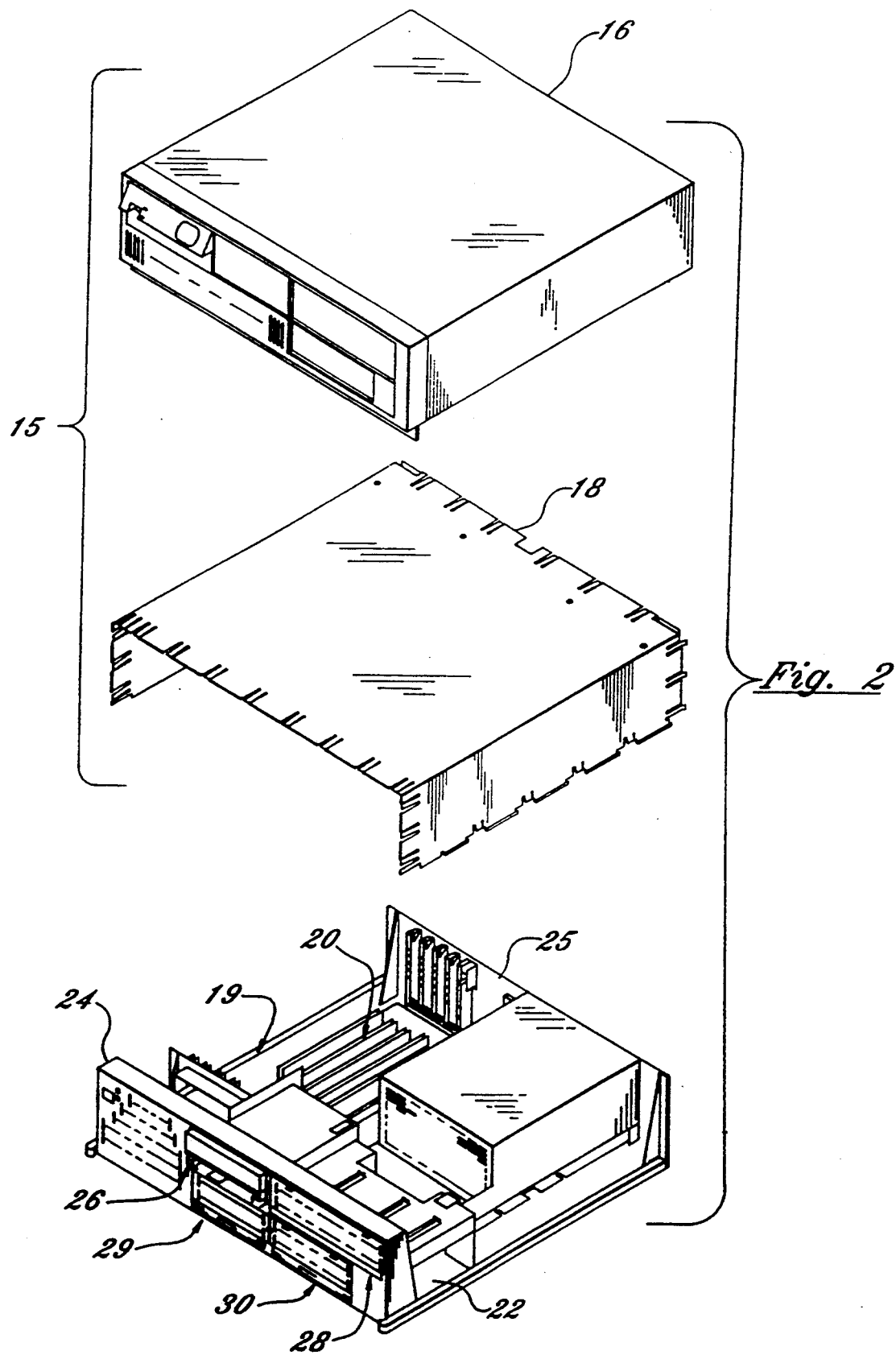
FIG. 2 is an exploded perspective view of certain elements of the personal computer of FIG. 1 including a chassis, a cover, an electromechanical direct access storage device and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided.

Figure 3:
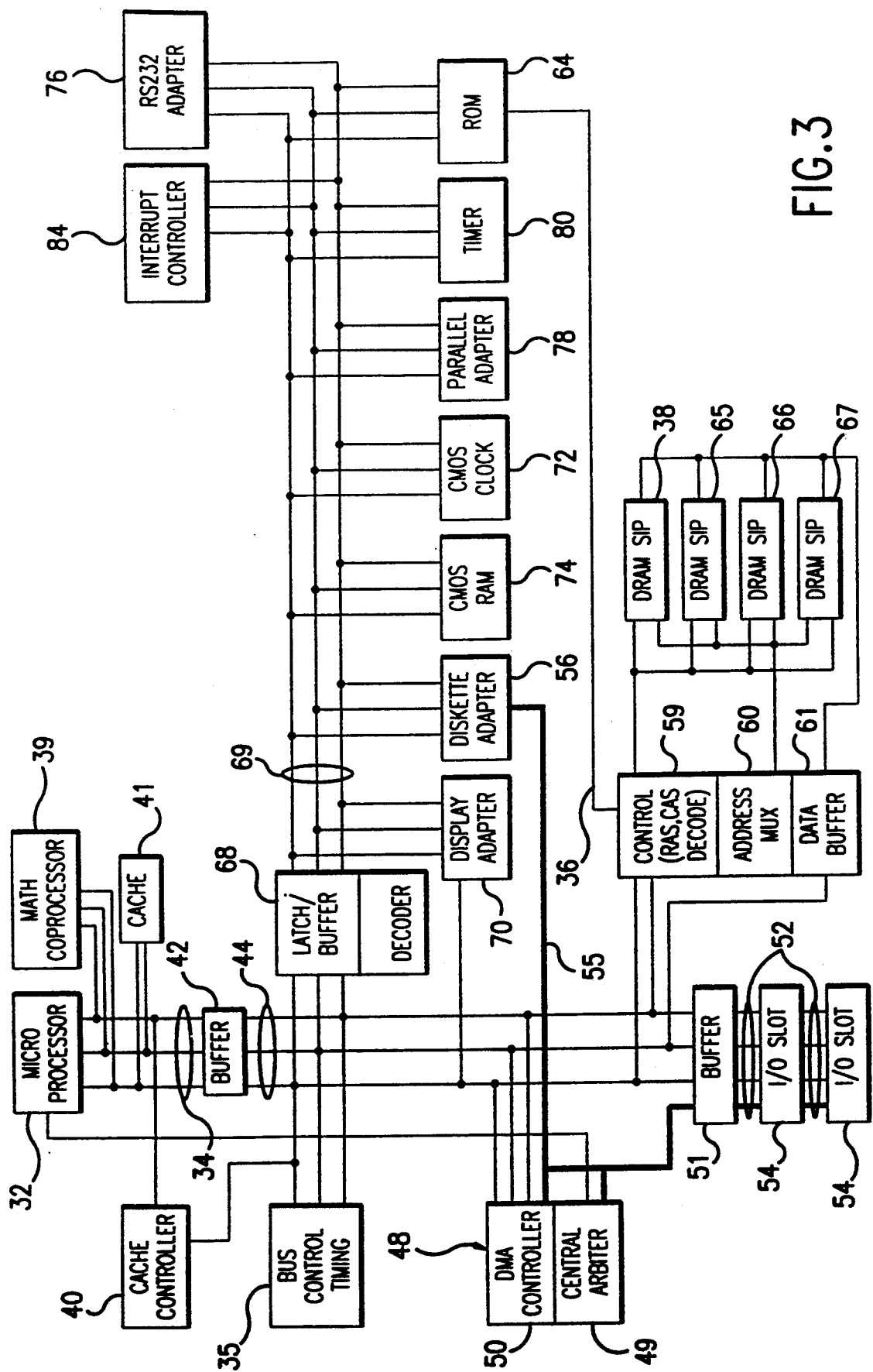
FIG. 3 is a schematic view of certain components of a prior art version of a personal computer similar to that of FIGS. 1 and 2.

Prior to relating the above structure to the present invention, a summary of the operation in general of prior art personal computers such as the personal computer system 10 may merit review. Referring to FIG. 3, there is shown a block diagram of a prior art personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor. In particular, the manner in which a personal computer 10 in accordance with this invention differs from the arrangement illustrated in FIG. 3 will be specifically pointed out hereinafter.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the AT bus 52. Connected to the bus 52 are a plurality of I/O slots 54 for receiving adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable the ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38. A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11) , a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory (ROM) 64. The read only memory 64 includes the BIOS that is used to interface between the I/O devices and the operating system of the microprocessor 32. BIOS stored in the ROM 64 can be copied into the RAM 38 to decrease the execution time of BIOS. The ROM 64 is further responsive (via ROMSEL signal) to the memory controller 36. If the ROM 64 is enabled by the memory controller 36, BIOS is executed out of ROM. If the ROM 64 is disabled by the memory controller 36, ROM is not responsive to address enquiries from the microprocessor 32 (i.e. BIOS is executed out of RAM).

The planar I/O bus 69, as described hereinafter, includes portions defined by conductive pathways formed in interior layers of the multilayer planar 20, and particularly includes a number of such pathways in a portion extending adjacent an edge of the planar 20 which is positioned to extend adjacent one of the front and rear panels of the chassis. Such design of the planar makes possible the location of a number of I/O connectors along such a side edge for exchange of signals with such devices as the monitor, keyboard and printer.

As mentioned above in the description of the technical field of this invention, the local processor bus 34 is where the system processor or CPU, any numeric coprocessor provided, and a processor support chip reside; the I/O or option bus (also known as the AT bus) 52 is where adapter cards reside; and the planar I/O bus 69 is the bus which is also known the XD bus. The interface specifications for each of these three busses differ from either of the other two, as will be well known to computer system designers working with the AT bus specification.

Figure 4:
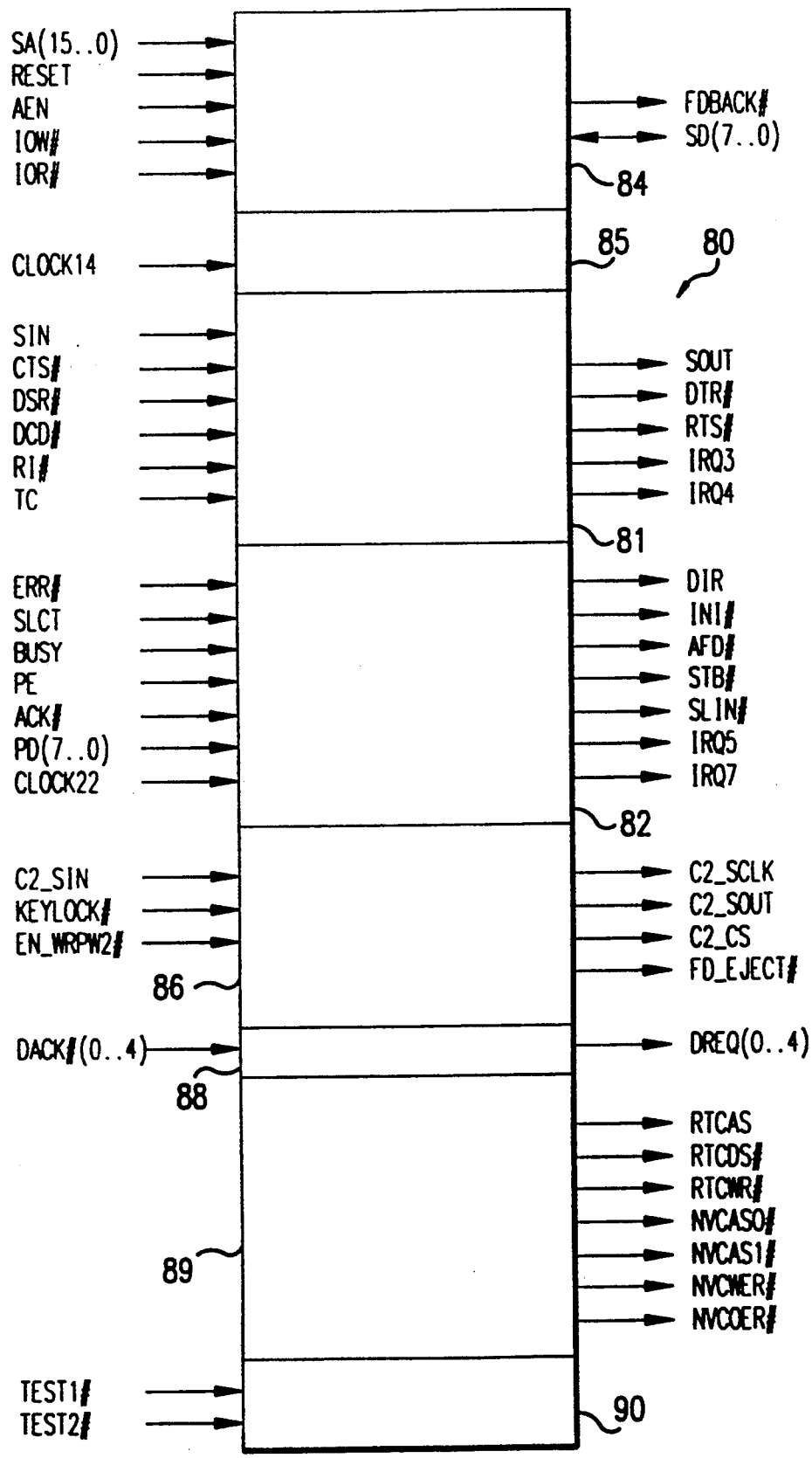
FIG. 4 is a schematic representation of an I/O controller which may, in accordance with this invention, be used in the computer of FIGS. 1 and 2 to replace certain components schematically shown in FIG. 3.

In accordance with one distinguishing characteristic of this invention, the prior provision of an RS232 port 76 and a parallel port 78 is varied and an I/O controller capable of connection through either of the planar I/O bus 69 or the I/O or option bus (also known as the AT bus) 52 is employed. Such an I/O controller is illustrated in FIG. 4, and attention will now be turned to a description of that controller and the differences between the schematic organization of the computer 10 of FIGS. 1 and 2 and that of the prior art computer of FIG. 3.

In particular, the I/O controller 80 of this invention (FIG. 4) provides a segment defining an interface (indicated at 81) for a serial port connection which substitutes for the prior RS232 port 76 and a segment defining an interface (indicated at 82) for a parallel port connection which substitutes for the prior parallel port connection 78. As the knowledgeable reader will understand, a serial port is one through which data signals pass with bits and bytes flowing serially, one after another. A parallel port is one through which data signals pass with the bits of a byte all flowing in parallel. Serial and parallel interfaces are standardized within the personal computer industry and the characteristics of such ports are well established and known.

The controller 80 also provides a bus interface (indicated at 84) which is capable of connection to either of the AT or XD busses, thereby opening substantial possibilities for varying placement of the I/O data paths while using a single component. More particularly, a single type of controller 80 may be used to effectuate connections of I/O devices using either serial or parallel connections through either of the busses identified while avoiding any necessity to redesign other elements of the system to accomplish that result. These characteristics of the controller 80 will be discussed more fully hereinafter.

The controller 80 further has a counter segment 85, a C 2 security interface segment 86, a DMA crossbar switch segment 88, an interface segment 89 to the RTC and NVRAM, and an interface 90 for chip testing.

Within the serial and parallel port segments of the I/O controller are provided state machines which require a certain minimum length -IOR or -IOW signal before allowing a command affecting data integrity to progress. This requirement eliminates false commands otherwise possibly resulting from short, false transitions as occur with noise derived from crosstalk between channels or transmission line effects. An example of the timing is given in FIG. 5.

As shown in FIG. 5, external commands reach the segments 81, 82 which define serial and parallel ports either from the CPU 32 or other element of the system or from external devices connected with the ports and thereby opened to data communication with the CPU 32. Such external commands have starting clock intervals and ending clock intervals. Noise appearing with such commands has less definite intervals.

In accordance with this invention, the state machine provided in each segment normally exists in an idle state, indicated on the "machine state" line of FIG. 5 as "a". When the state machine detects a transition on the external command, the state machine begins to progress through a defined sequence of states with successive clock signals received in the parallel port segment 82. If the transition was a glitch or error, the state machine will have returned to an inactive state ("a") before progressing far enough into the sequence of states to have passed a command onward (also known as having issued an internal command, to distinguish between the "external" command received on signal transmitting lines from another device). If the transition is in fact an external command, then it will be sustained for a length of time sufficient to cause the state machine to progress to a state at which the internal command is issued (as particularly illustrated in FIG. 5). The machine then passes into a wait state "e" at which it waits for the external command signal to terminate before returning to the initial wait state "a". A state sequence table appearing as FIG. 6 illustrates the sequence of states of the embedded state machines. As will be known to the knowledgeable reader, such a state machine is usually configured out of a set on interconnected gates and the like formed during manufacture of a large scale integrated or very large scale integrated circuit device, such as may form the I/O controller 80. The state machine(s) here described reject transmission line noise on the leading and trailing edged of external commands while providing set up and hold timings appropriate to recognize data passing to internal logic within the system 10. Timing of transitions in accordance with this invention and the relationship of those timings with the occurrence of valid data to be passed on the data portions of an affected bus are illustrated in FIG. 7. Target command timings and logic frequency may be varied as required to accommodate particular system operations while retaining the concept and operation here described. Further, while here disclosed as embedded within the parallel port segment 82 of the I/O controller 80, the state machine concept described may be applied to other components or elements of a personal computer system in order to reduce or eliminate the effects of crosstalk and transmission line noise.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:

a local processor bus for passing data signals;

a microprocessor operatively connected with said local processor bus for transfer of data signals through said local processor bus;

an option bus for receiving option cards and for passing data signals to and from any option card received;

a planar I/O bus for passing data signals;

a bus controller operatively connected with said local processor bus and said option bus and said planar I/O bus for controlling passage of data signals between any two of said local processor bus and said option bus and said planar I/O bus to and from said microprocessor; and a signal passing component operatively connected for exchange of data signals with system components operatively connected with said local processor bus and having a segment providing a state machine for receiving external command signals passed on one of said busses and for passing internal command signals identifying valid data intervals, said state machine requiring a predetermined minimum length of external command signal for issuance of an internal command signal and terminating an internal command signal with termination of an external command signal so as to avoid any adverse effects of crosstalk and transmission line noise on external command signals and loss of data integrity thereby possibly occurring.

2. A personal computer system in accordance with claim 1 wherein said state machine sequences the continuance of any internal command signal being passed to identify a valid data interval so as to terminate said continuance of said internal command signal being passed prior to the end of any valid data interval so identified.

3. A personal computer system comprising:

a local processor bus for passing data signals;

a microprocessor operatively connected with said local processor bus for transfer of data signals through said local processor bus;

an option bus for receiving option cards and for passing data signals to and from any option card received;

a planar I/O bus for passing data signals;

a bus controller operatively connected with said local processor bus and said option bus and said planar I/O bus for controlling passage of data signals between any two of said local processor bus and said option bus and said planar I/O bus to and from said microprocessor; and an I/O controller having a plurality of segments, a first one of said segments providing a serial port for exchange of data signals with said local processor bus, a second one of said segments providing a parallel port for exchange of data signals with said local processor bus, and a state machine for receiving external command signals passed on one of said busses and for passing internal command signals identifying valid data intervals, said state machine requiring a predetermined minimum length of external command signal for issuance of an internal command signal and terminating an internal command signal with termination of an external command signal so as to avoid any adverse effects of crosstalk and transmission line noise on external command signals and loss of data integrity thereby possibly occurring.

4. A personal computer system in accordance with claim 3 wherein said I/O controller is connected directly to said option bus.

5. A personal computer system in accordance with claim 3 wherein said I/O controller is connected directly to said planar I/O bus.

6. A personal computer system in accordance with claim 3 wherein said state machine sequences the continuance of any internal command signal being passed to identify a valid data interval so as to terminate said continuance of said internal command signal being passed prior to the end of any valid data interval so identified.

* * * * *